(12) United States Patent
Boon

(10) Patent No.: US 10,875,287 B2
(45) Date of Patent: Dec. 29, 2020

(54) WIND TURBINE BLADES

(71) Applicant: Vestas Wind Systems A/S, Aarhus N. (DK)

(72) Inventor: Christopher Boon, Cowes (GB)

(73) Assignee: Vestas Wind Systems A/S, Aarhus N. (DK)

(*) Notice: Subject to any disclaimer, the term of this patent is extended or adjusted under 35 U.S.C. 154(b) by 874 days.

(21) Appl. No.: 14/429,180

(22) PCT Filed: Sep. 18, 2013

(86) PCT No.: PCT/DK2013/050296
§ 371 (c)(1),
(2) Date: Mar. 18, 2015

(87) PCT Pub. No.: WO2014/044280
PCT Pub. Date: Mar. 27, 2014

(65) Prior Publication Data
US 2015/0224759 A1    Aug. 13, 2015

Related U.S. Application Data

(60) Provisional application No. 61/702,302, filed on Sep. 18, 2012.

(30) Foreign Application Priority Data

Sep. 18, 2012   (DK) ................................ 2012 70575

(51) Int. Cl.
*B32B 38/18* (2006.01)
*B29C 70/38* (2006.01)
(Continued)

(52) U.S. Cl.
CPC .......... *B32B 38/1808* (2013.01); *B29C 70/30* (2013.01); *B29C 70/38* (2013.01);
(Continued)

(58) Field of Classification Search
CPC combination set(s) only.
See application file for complete search history.

(56) References Cited

U.S. PATENT DOCUMENTS 5,676,327 A * 10/1997 Wittrisch ............... B65H 75/38
242/390.3
6,544,367 B1 * 4/2003 Fujimoto ........... B65H 35/0013
156/187
(Continued)

FOREIGN PATENT DOCUMENTS

EP        1520983 A1     4/2005
EP        2128058 A1     12/2009
(Continued)

OTHER PUBLICATIONS

International Searching Authority, International Search Report issued in corresponding Application No. PCT/DK2013/050296, dated Dec. 16, 2013, 11 pages.
(Continued)

*Primary Examiner* — Joel G Horning
(74) *Attorney, Agent, or Firm* — Wood Herron & Evans LLP

(57) ABSTRACT

A method of making a wind turbine blade having at least one pultruded strip of fibrous reinforcing material integrated with a shell of the blade is described. The method comprises the steps of: providing at a first location a feed apparatus for dispensing a pultruded strip of fibrous reinforcing material; supporting a coiled pultruded strip of fibrous reinforcing material for rotation in the feed apparatus; causing the coiled strip to rotate in the feed apparatus at the first location; and feeding a free end of the strip from the feed apparatus in a feed direction towards a second location remote from the first location. An associated feed apparatus for use in the method is also described.

10 Claims, 15 Drawing Sheets

(51) Int. Cl.
*B29C 70/30* (2006.01)
*F03D 1/06* (2006.01)

(52) U.S. Cl.
CPC ........ *F03D 1/0675* (2013.01); *B32B 2305/10* (2013.01); *F05B 2230/30* (2013.01); *Y02E 10/72* (2013.01); *Y02P 70/50* (2015.11); *Y10T 156/1788* (2015.01)

(56) References Cited

U.S. PATENT DOCUMENTS

| | | | |
|---|---|---|---|
| 2004/0178301 A1* | 9/2004 | Wampler | B65H 75/146 242/603 |
| 2008/0169579 A1 | 7/2008 | Mueller-Hummel et al. | |
| 2012/0027609 A1 | 2/2012 | Ogde et al. | |

FOREIGN PATENT DOCUMENTS

| | | |
|---|---|---|
| GB | 2497578 A | 6/2013 |
| WO | 2006082479 A1 | 8/2006 |
| WO | 2009059604 A1 | 5/2009 |
| WO | 2012024377 A1 | 2/2012 |

OTHER PUBLICATIONS

Danish Patent and Trademark Office, Danish Search Report issued in corresponding Application No. PA 2012 70575, dated Mar. 1, 2013, 6 pages.

\* cited by examiner

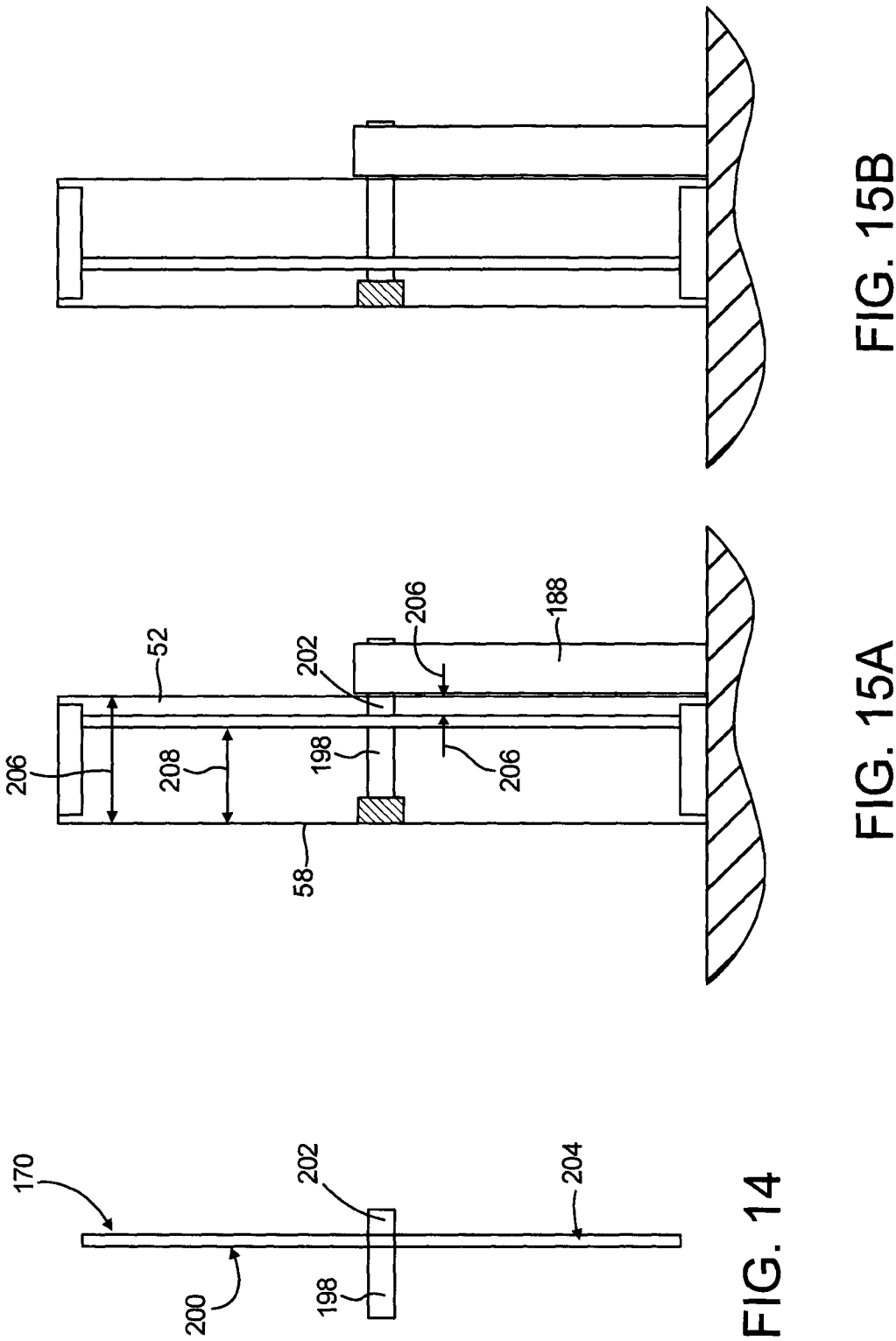

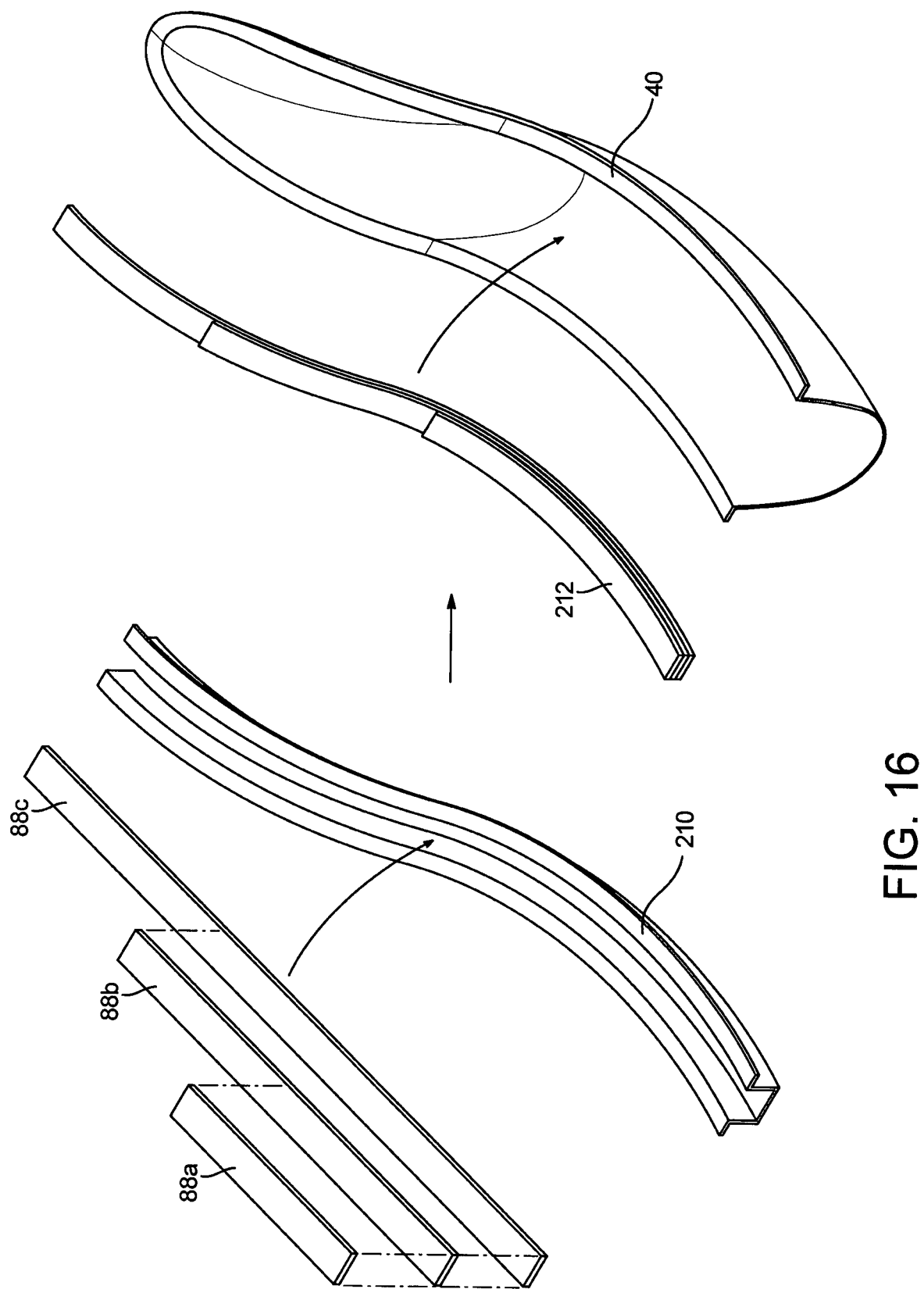

WIND TURBINE BLADES

TECHNICAL FIELD

The present invention relates to wind turbine blades and to methods of manufacturing wind turbine blades. More specifically, the present invention relates to wind turbine blades that include a stack of load-bearing reinforcing strips integrated within the structure of the shell.

BACKGROUND

FIG. 1a is a cross-sectional view of a wind turbine rotor blade 10. The blade has an outer shell, which is fabricated from two half shells: a windward shell 11a and a leeward shell 11b. The shells 11a and 11b are moulded from glass-fibre reinforced plastic (GRP). Parts of the outer shell 11 are of sandwich panel construction and comprise a core 12 of lightweight foam (e.g. polyurethane), which is sandwiched between inner 13 and outer 14 GRP layers or 'skins'.

The blade 10 comprises a first pair of spar caps 15a and 15b and a second pair of spar caps 16a, 16b. The respective pairs of spar caps 15a and 15b, 16a and 16b are arranged between sandwich panel regions of the shells 11a and 11b. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16a and 16b has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The number of strips 18 in the stack depends upon the thickness of the strips 18 and the required thickness of the shells 11a and 11b, but typically the strips 18 each have a thickness of a few millimetres and there may be between three and twelve strips in the stack. The strips 18 have a high tensile strength, and hence have a high load bearing capacity.

The blade 10 is made using a resin-infusion process as will now be described by way of example with reference to FIGS. 1b and 1c. Referring to FIG. 1b, this shows a mould 20 for a half shell of a wind turbine blade in cross-section. A glass-fibre layer 22 is arranged in the mould 20 to form the outer skin 14 of the blade 10. Three elongate panels 24 of polyurethane foam are arranged on top of the glass-fibre layer 22 to form the sandwich panel cores 12 referred to above. The foam panels 24 are spaced apart relative to one another to define a pair of channels 26 in between. A plurality of pultruded strips 18 of CFRP, as described above with reference to FIG. 1a, are stacked in the respective channels 26. Three strips 18 are shown in each stack in this example, but in reality there may be any number of strips 18 in a stack.

Referring to FIG. 1c, once the strips 18 have been stacked, a second glass-fibre layer 28 is arranged on top of the foam panels 24 and the stacks of pultruded strips 18. The second glass-fibre layer 28 forms the inner skin 13 of the blade 10. Next, vacuum bagging film 30 is placed over the mould 20 to cover the layup. Sealing tape 32 is used to seal the vacuum bagging film 30 to a flange 34 of the mould 20. A vacuum pump 36 is used to withdraw air from the sealed region between the mould 20 and the vacuum bagging film 30, and resin 38 is supplied to the sealed region. The resin 38 infuses between the various laminate layers and fills any gaps in the laminate layup. Once sufficient resin 38 has been supplied to the mould 20, the mould 20 is heated whilst the vacuum is maintained to cure the resin 38 and bond the various layers together to form the half shell of the blade. The other half shell is made according to an identical process. Adhesive is then applied along the leading and trailing edges of the shells and the shells are bonded together to form the complete blade.

The integration of the spar caps 15a and 15b and 16a and 16b within the structure of the outer shells 11a and 11b avoids the need for a separate spar cap such as a reinforcing beam, which is typically bonded to an inner surface of the shell in many conventional wind turbine blades. Other examples of rotor blades having spar caps integral with the shell are described in EP 1 520 983, WO 2006/082479 and UK Patent Application No. 1121649.6.

The CFRP pultruded strips 18 extend along the majority of the length of the wind turbine blade 10. Modern wind turbine blades may be in excess of eighty metres long, and so it will be appreciated that these strips are very long and heavy. The length and weight of the strips presents challenges relating to the manufacture of the blades, and relating to the handling and transportation of the strips. The present invention aims to address these challenges by providing a convenient method of manufacturing this type of wind turbine blade, and by providing apparatus for use in the method.

SUMMARY OF THE INVENTION

According to the present invention, there is provided a method of making a wind turbine blade having at least one pultruded strip of fibrous reinforcing material integrated with a shell of the blade, the method comprising the steps of:
  a. providing at a first location a feed apparatus for dispensing a pultruded strip of fibrous reinforcing material;
  b. supporting a coiled pultruded strip of fibrous reinforcing material for rotation in the feed apparatus;
  c. causing the coiled strip to rotate in the feed apparatus at the first location; and
  d. feeding a free end of the strip from the feed apparatus in a feed direction towards a second location remote from the first location.

The invention also provides a feed apparatus for feeding pultruded strips of fibrous reinforcing material in a feed direction, the apparatus comprising: an enclosure for housing a coiled pultruded strip of fibrous reinforcing material and retaining the strip in a coiled formation as the coil rotates within the enclosure, wherein the enclosure has an outlet through which a free end of the strip exits the enclosure as the coil turns within the enclosure.

The method may involve feeding the strips to a blade part manufacturing tool. The feed apparatus may be placed at one end of the blade part manufacturing tool, and the strips may be fed into or onto the tool. In preferred embodiments of the invention, the blade part manufacturing tool is a wind turbine blade mould. Hence, the method may involve feeding the strips directly into the wind turbine blade mould.

Alternatively, the blade part manufacturing tool may be an assembly jig or other such tool, and the method may involve feeding the strips to the tool and then transferring the strips from the tool into a wind turbine blade mould. In other embodiments, the method may involve feeding the strips onto another suitable surface, such as the factory floor, before transferring the strips to the wind turbine blade mould.

Preferably the method involves stacking the strips one on top of the other to form a stack of strips. The strips may be fed into the blade mould and stacked inside the blade mould, or alternatively the strips may be stacked outside the blade mould, for example on the blade part manufacturing tool or on the factory floor, and then the stack may be transferred into the blade mould. To facilitate transferring the stack to the mould, the blade part manufacturing tool may be substantially the same height as the wind turbine blade mould. The method preferably involves integrating the stacked strips together to form a stiff spar cap unit. The integration process may take place inside the blade mould, or alternatively the strips may be integrated before being transferred to the mould.

Due to the length of the pultruded strips, it is convenient to store and transport the strips in the form of a coil or roll. Restraining straps may be used to retain the strip in a coiled formation. The straps must be cut in order to uncoil the strip. However, it will be appreciated that a significant amount of potential energy is stored in a pultruded strip of CFRP when coiled. The stored potential energy results from the long unidirectional fibres in the strip seeking to straighten when the restraining straps are cut. Hence, when the straps are cut, the strip will attempt to uncoil rapidly and potentially uncontrollably.

The feed apparatus of the present invention serves to contain the strip when the straps are cut so that the strip does not uncoil in an uncontrolled and potentially dangerous manner. The enclosure of the feed apparatus may partially or fully encapsulate the coil. Further the feed apparatus is configured to feed the strip from the roll to the tool in a steady and controlled manner.

Whilst other materials used in blade manufacturing are commonly supplied as a roll, for example rolls of glass-fibre fabric, these materials generally do not have significant amounts of stored potential energy and so can be unrolled in the mould in a conventional manner. The conventional way of unrolling such materials is to position the free end of the material at a desired location and then to unroll the coiled part of the material manually along the mould.

The stored potential energy in a coiled pultruded strip makes it impossible to unroll the strip in the conventional manner. It will be appreciated that a significant difference between the present invention and the conventional unrolling technique described above is that in the present invention the coiled part of the strip remains at a fixed location, e.g. at the root of the blade mould, and the free end of the strip is fed in the feed direction, whilst in the conventional method the coiled part of the material is moved whilst the free end remains in a fixed position.

Factory floor space is saved by virtue of the apparatus and method of the present invention because the strip remains coiled until it is fed to the tool. The feed apparatus and method of the present invention significantly facilitates the handling of the strips during the manufacturing process and allows the placement of the strips on the tool to be overseen by a single operator as relatively little (if any) manual handling of the strips is required.

Various other optional features of the invention are set out in the appended sub-claims.

Figure 2:
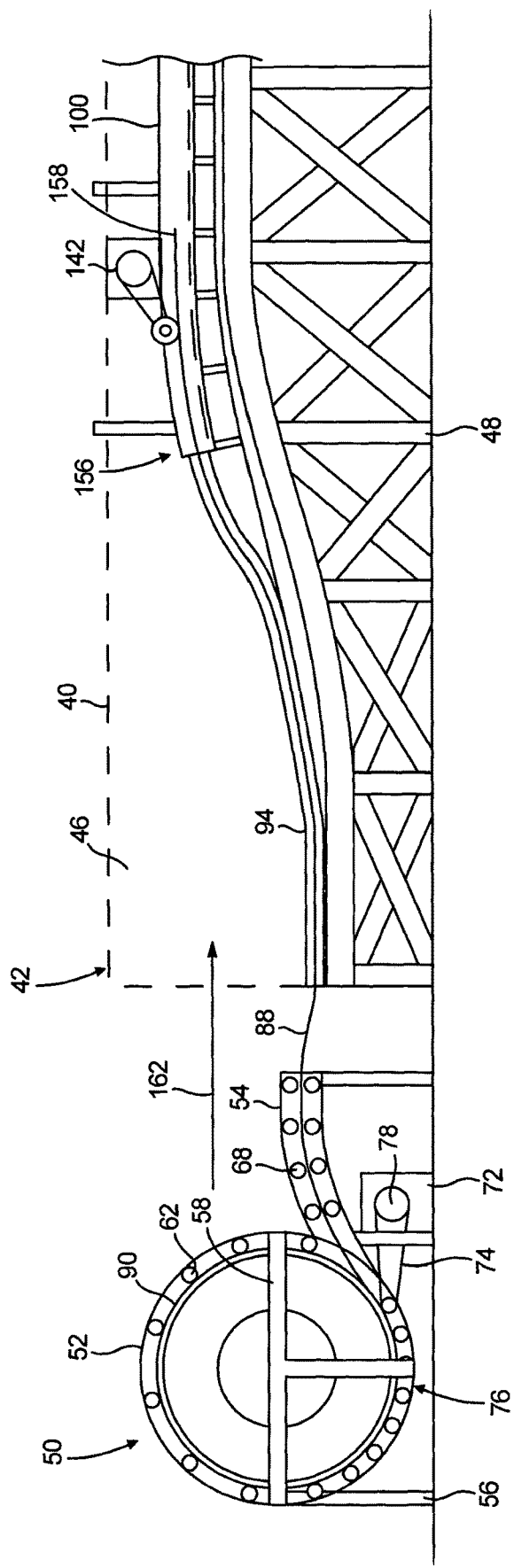
Figure 3:
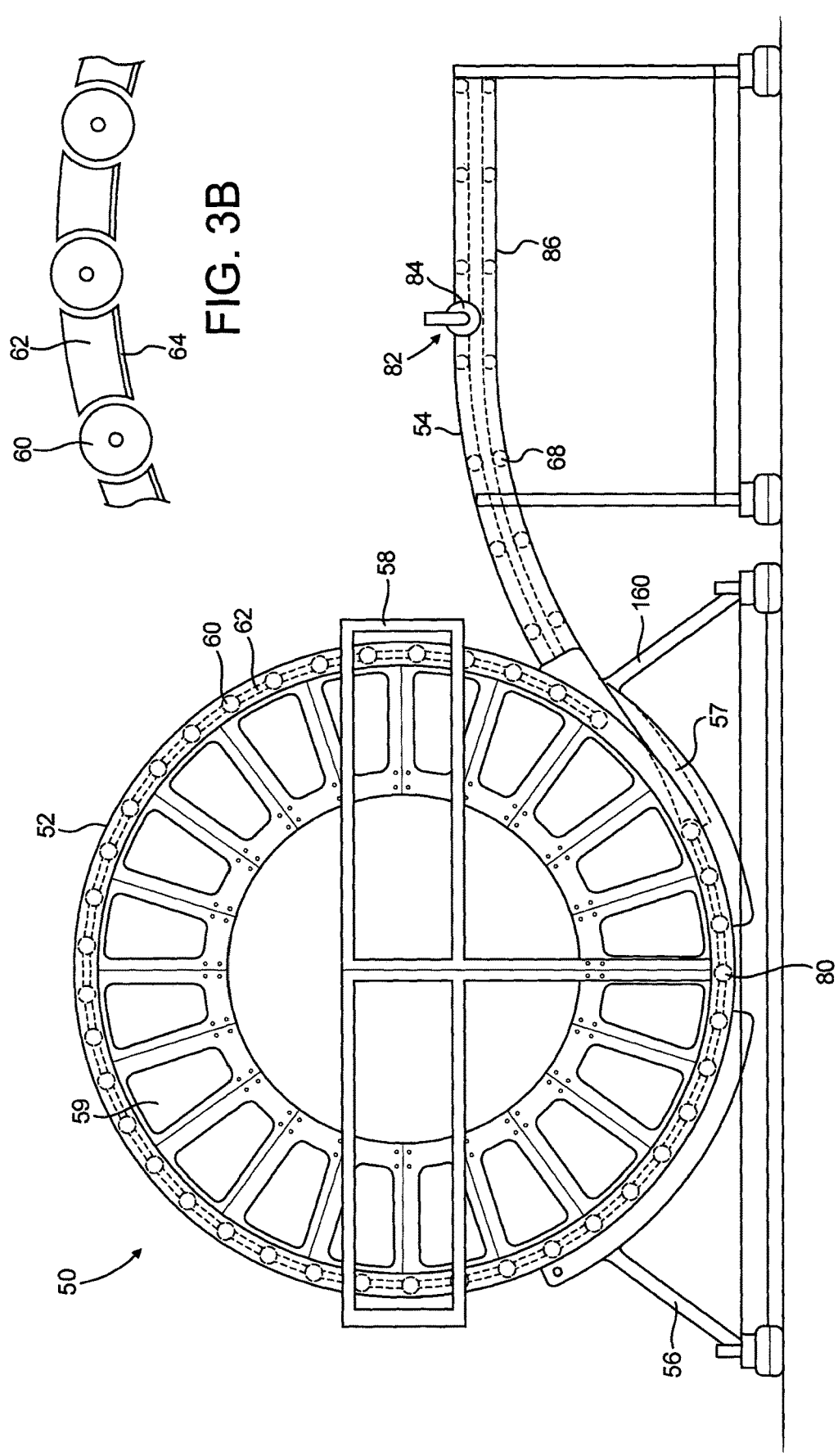
Figure 4:
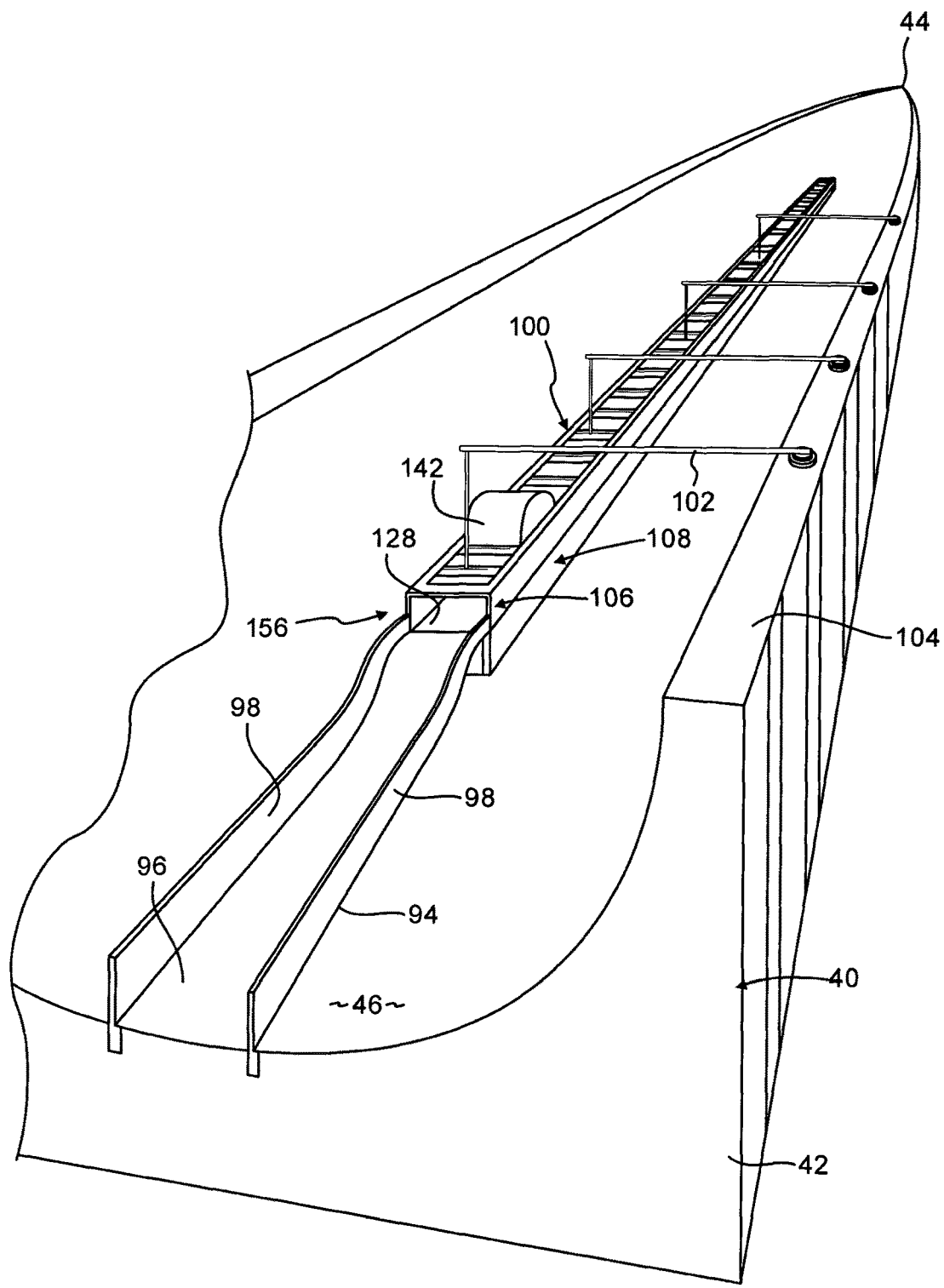
Figure 5:
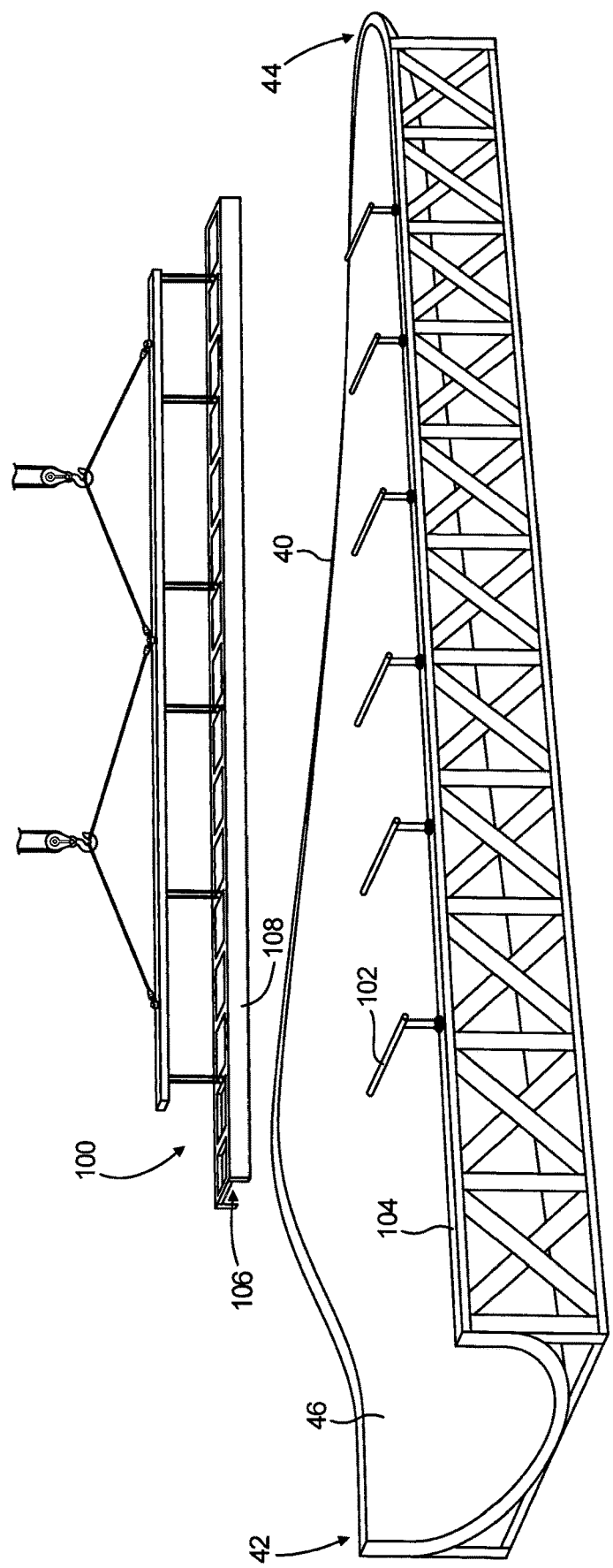
Figure 6:
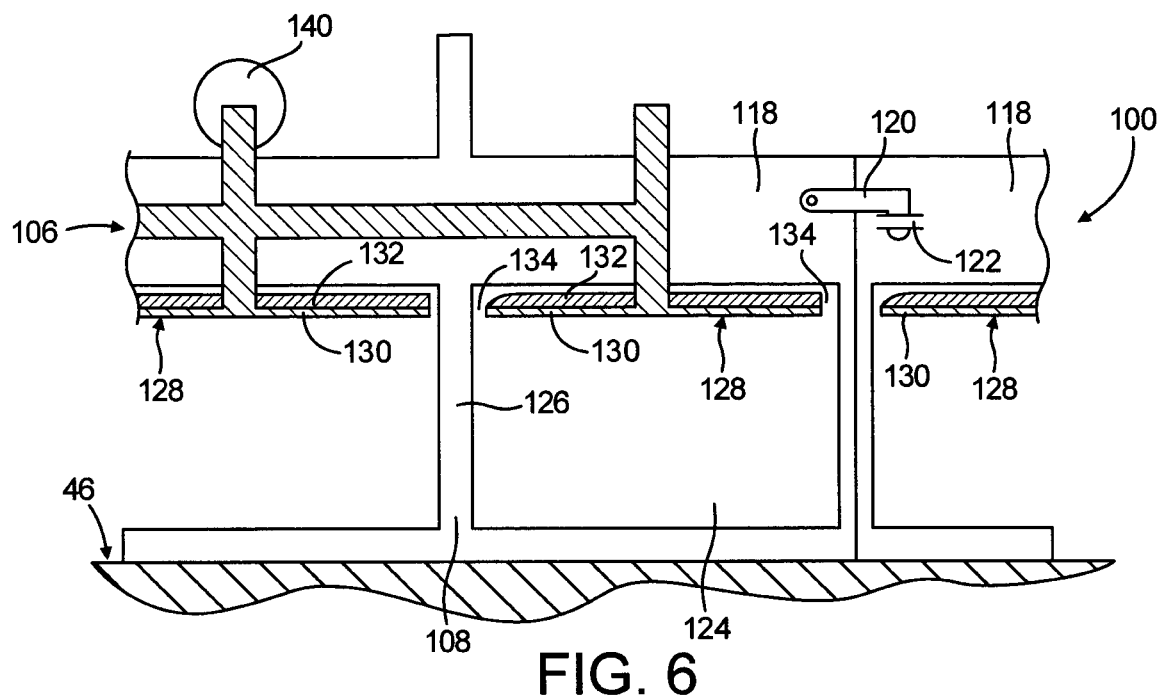
Figure 7A:
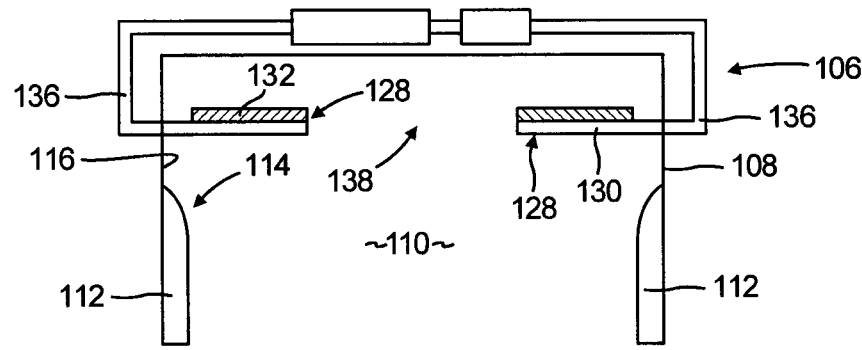
Figure 7B:
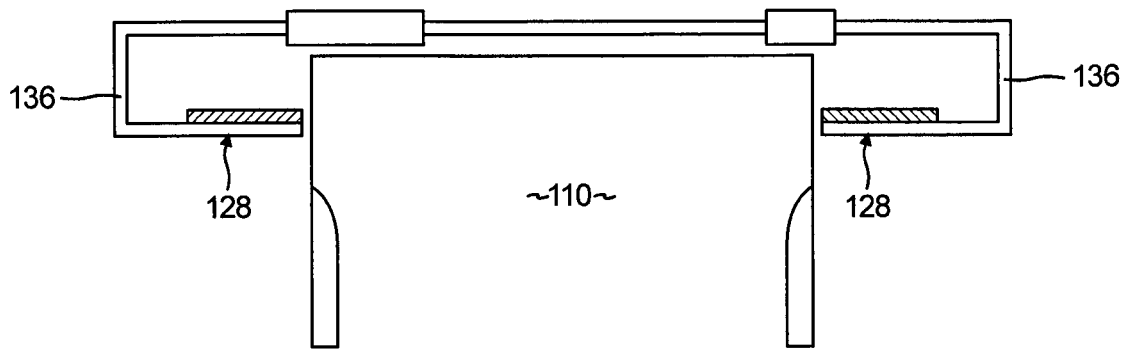
Figure 8A:
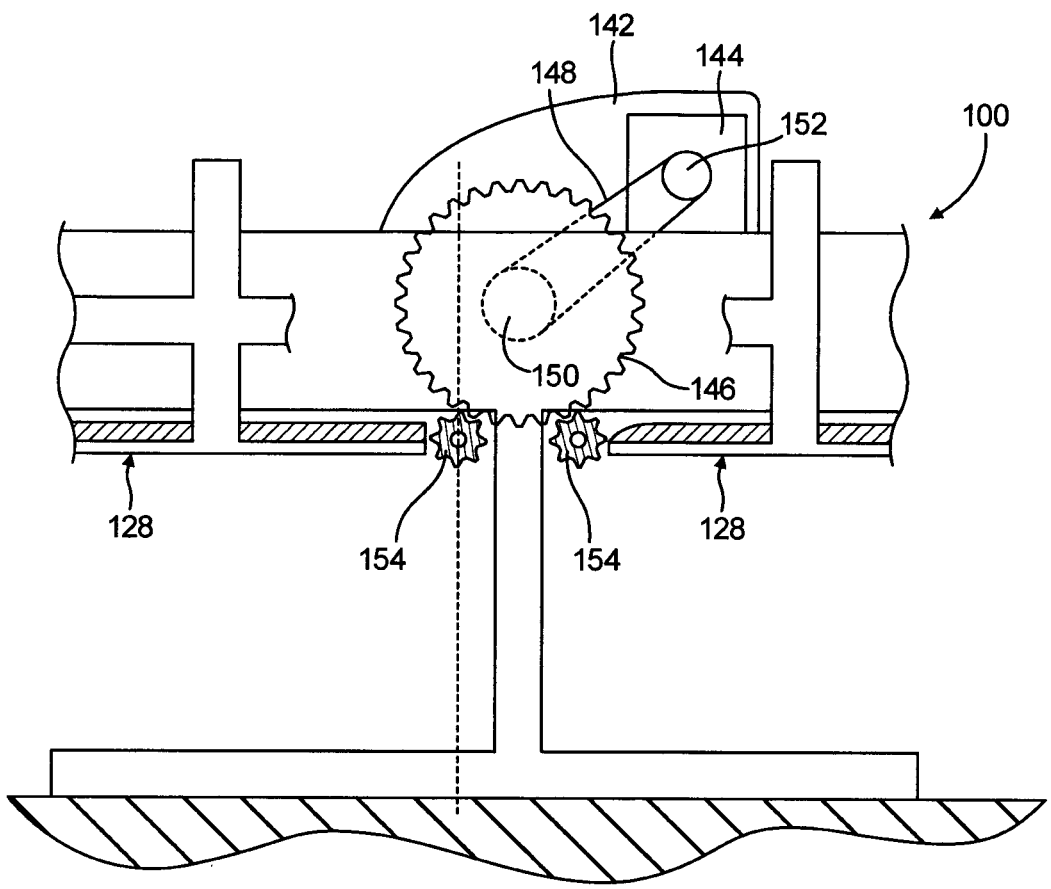
Figure 8B:
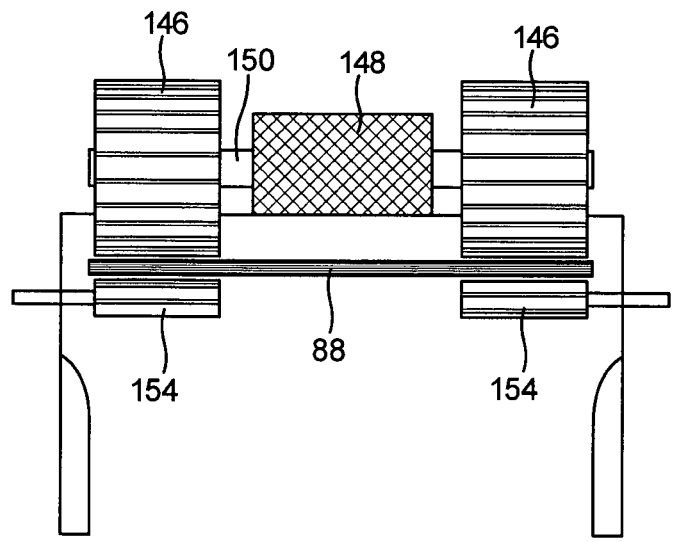
Figure 9A:
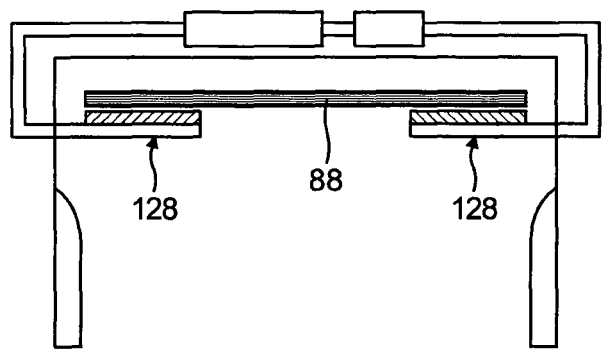
Figure 9B:
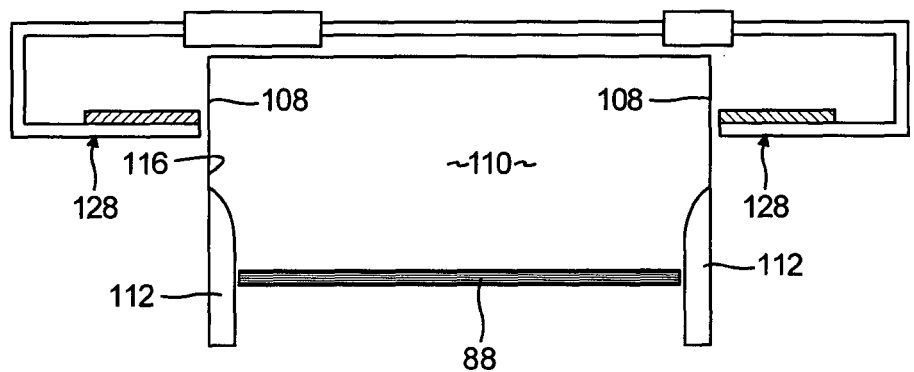
Figure 9C:
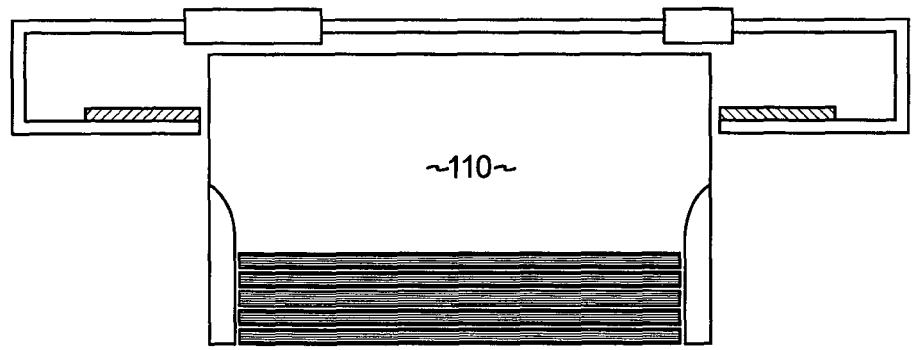
Figure 10A:
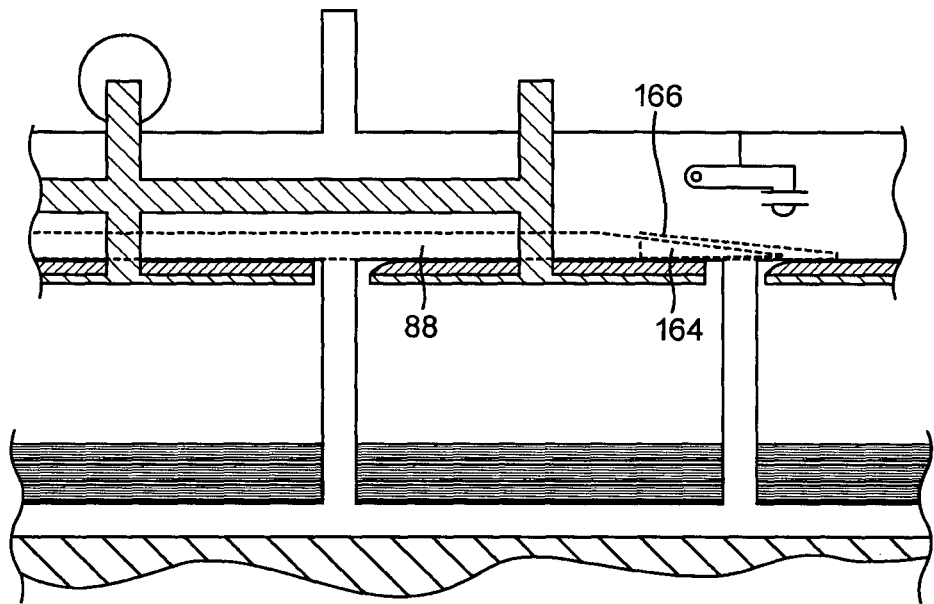
Figure 10B:
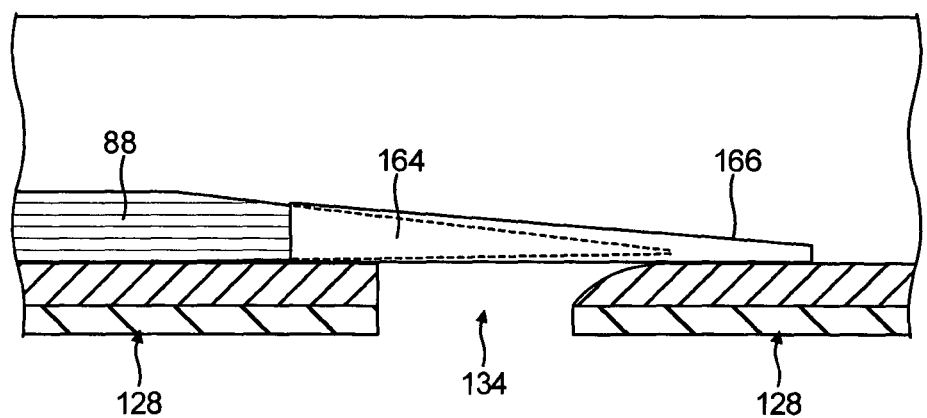
Figure 11A:
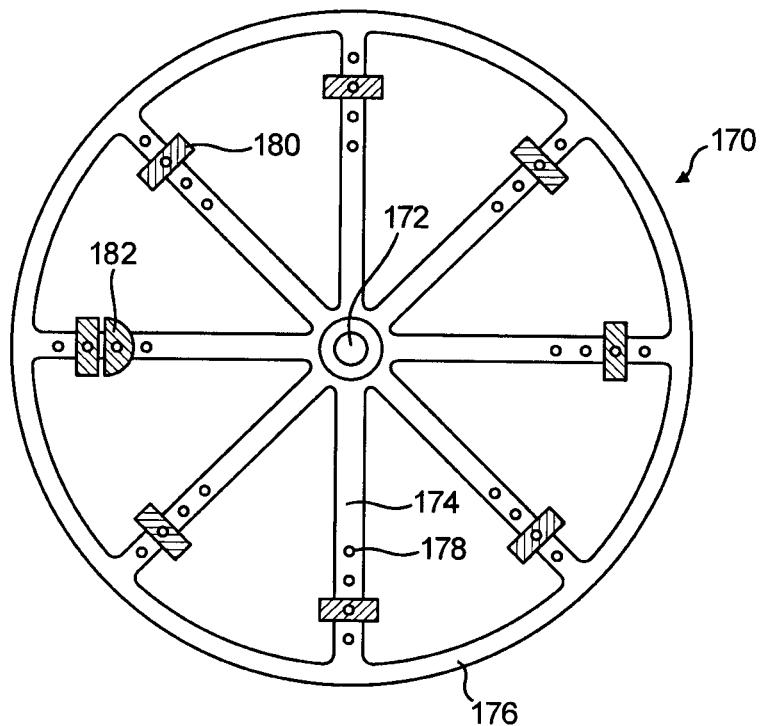
Figure 11B:
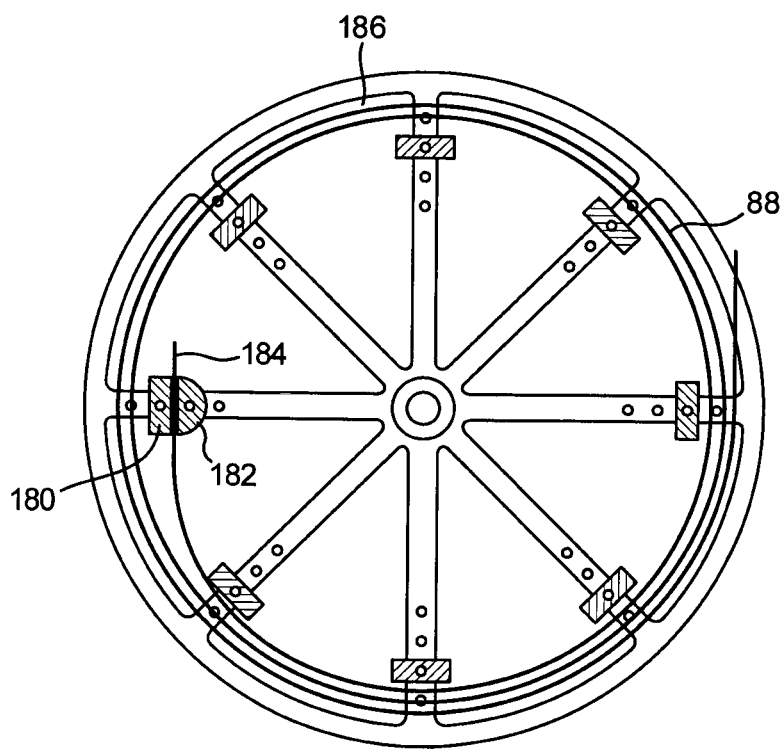
Figure 12:
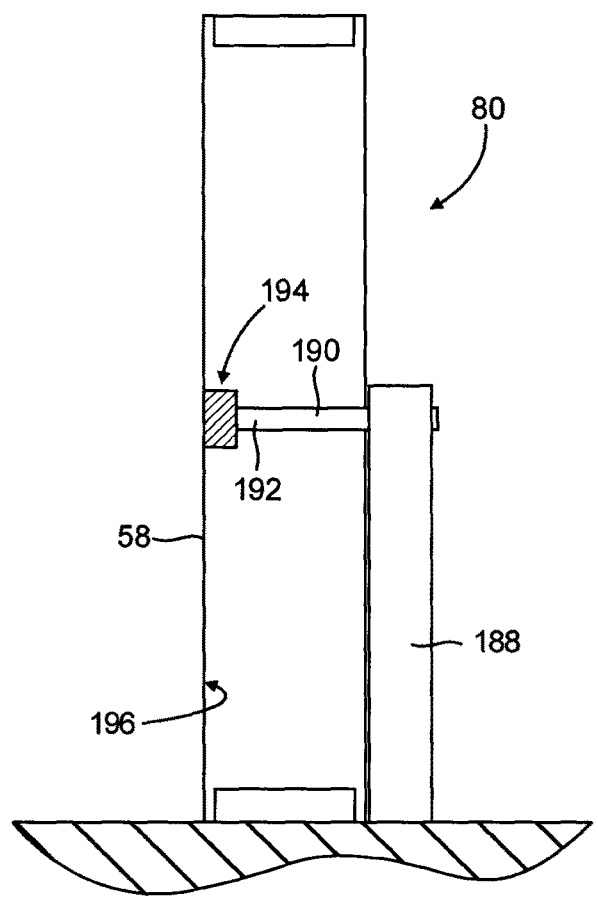
Figure 13:
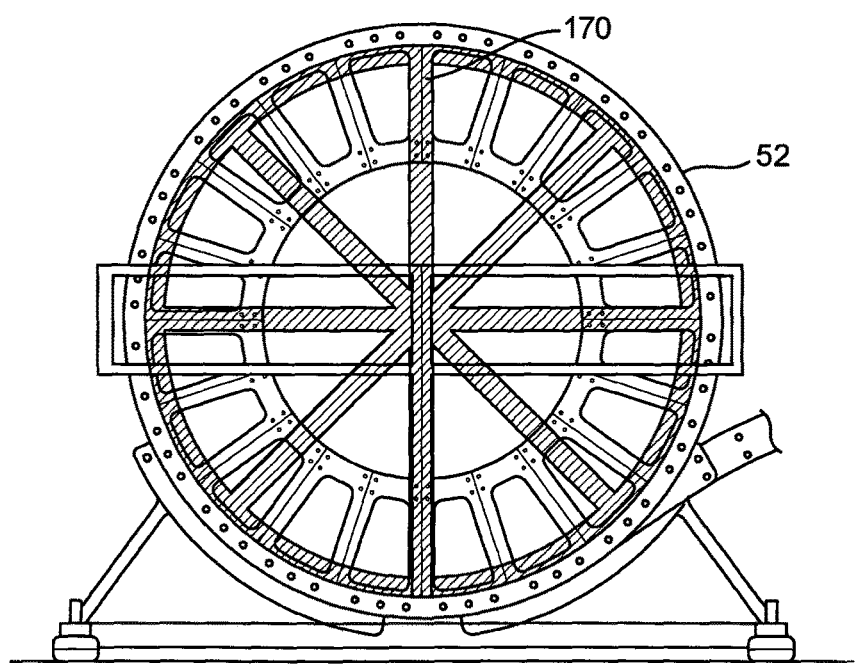
Figure 17:
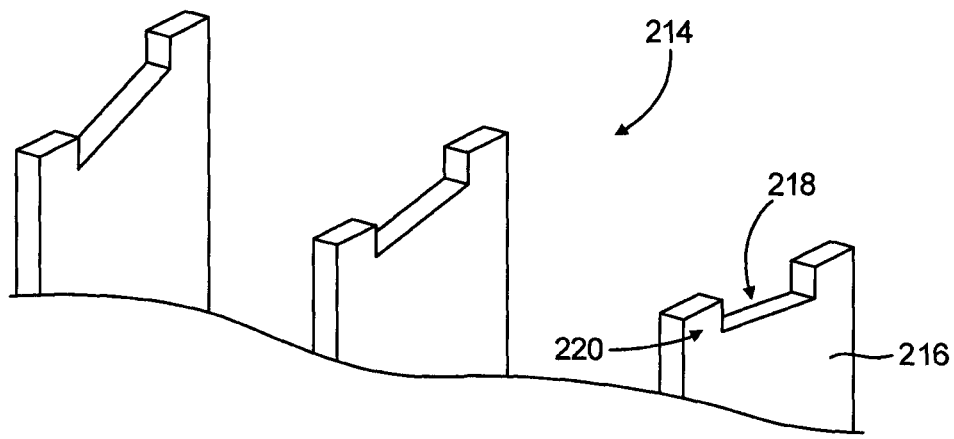
Figure 18A:
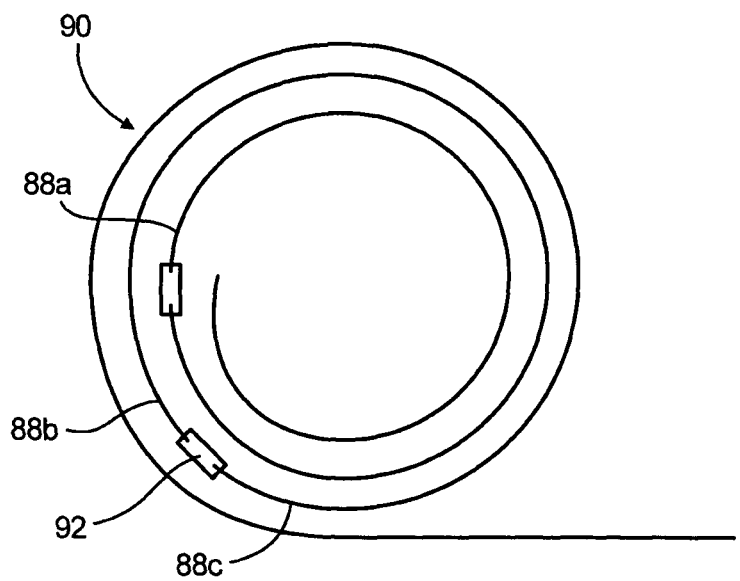
Figure 18B:
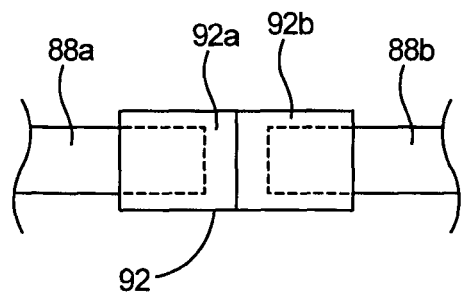
Figure 19:
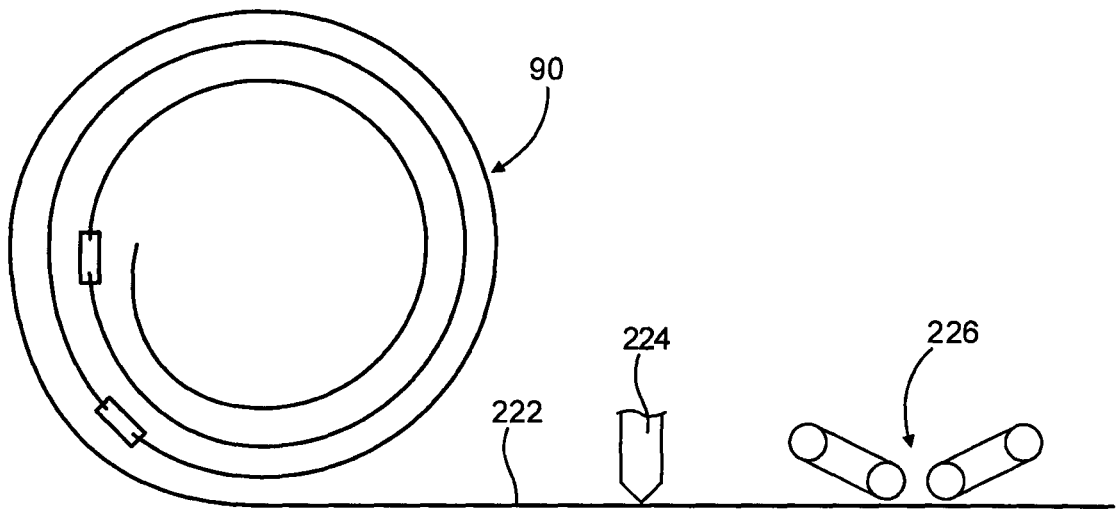
Figure 20:
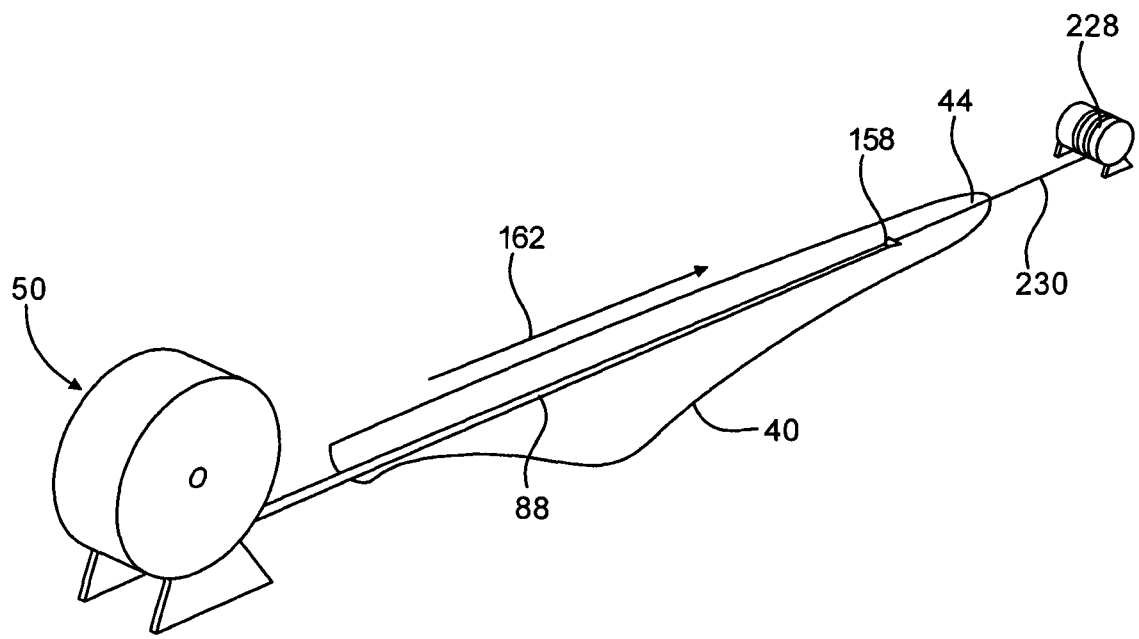

In order that the present invention may be more readily understood, embodiments of the invention will now be described, by way of example only, with reference to FIGS. 2 to 20 of the accompanying drawings, in which:

FIG. 2 shows a feed apparatus according to the present invention arranged at a root end of a wind turbine blade mould, and a placement system arranged in the mould;

FIG. 3a shows the feed apparatus of FIG. 2 in more detail;

FIG. 3b is a close-up view of part of FIG. 3a;

FIG. 4 is a perspective view of the wind turbine blade mould of FIG. 2 as viewed from the root end, and showing the placement system of FIG. 2 extending longitudinally in the mould;

FIG. 5 is a further perspective view of the wind turbine blade mould of FIG. 2 showing the placement system being lifted into the mould;

FIG. 6 is a side view of part of the placement system;

FIG. 7a is a transverse cross-sectional view of the placement system, in which a pair of runners is arranged in a closed position;

FIG. 7b shows the runners of FIG. 7a arranged in an open position;

FIG. 8a is a partial longitudinal cross-sectional view of part of the placement system showing a power drive unit;

FIG. 8b is a transverse cross-sectional view through part of the power drive unit of FIG. 8a;

FIG. 9a is a transverse cross-sectional view of the placement system showing a carbon fibre composite strip supported on the runners with the runners in the closed position;

FIG. 9b shows the runners moved to the open position causing the strip to drop into the mould;

FIG. 9c shows a stack of carbon fibre composite strips which have been arranged in the mould successively using the placement system;

FIG. 10a is a side view of part of the placement system showing a stack of strips arranged in the mould and a further strip supported on the runners to be added to the stack;

FIG. 10b is a close-up view of part of FIG. 10a showing a protective sleeve provided on a tapered end of the strip;

FIG. 11a shows an optional carrier plate of the feed apparatus;

FIG. 11b shows a coiled carbon fibre composite strip supported on the carrier plate;

FIG. 12 is a transverse cross-sectional view of the feed apparatus;

FIG. 13 is a side view of part of the feed apparatus showing the carrier plate mounted inside an enclosure of the feed apparatus;

FIG. 14 is a transverse cross-sectional view through the centre of the carrier plate of FIG. 11a;

FIGS. 15a and 15b illustrate how the carrier plate is reversibly mountable inside the enclosure of the feed apparatus to enable strips of different widths to be accommodated within the enclosure;

FIG. 16 illustrates an alternative method in the manufacture of a wind turbine blade in accordance with an embodiment of the present invention;

FIG. 17 shows an assembly jig on which a plurality of strips may be stacked in in accordance with a further embodiment of the present invention;

FIG. 18a shows a roll comprising a plurality of pultruded strips coiled sequentially and having their respective ends connected together in series;

FIG. 18b is a close-up view of a connector for connecting the ends of adjacent strips in the roll shown in FIG. 18a;

FIG. 19 illustrates a further embodiment of the present invention in which the roll comprises a single strip which is cut to form a plurality of strips during the feed process by a cutting tool arranged in line with the feed apparatus; and FIG. 20 illustrates a further embodiment of the present invention in which a motorised pulley is located adjacent the tip end of the mould and arranged to pull the strip from the feed device across the mould.

DETAILED DESCRIPTION

FIG. 2 shows a longitudinal cross-section of part of a mould 40 for a wind turbine blade. The mould 40 extends longitudinally from a root end 42 to a tip end 44. Only the root end 42 of the mould 40 is shown in FIG. 2, but the entire mould 40 including the tip end 44 is shown in FIG. 5. The mould 40 is for a half shell of the blade, such as the windward shell or the leeward shell. The mould 40 has an inner surface 46, which is generally concave-curved in a chordwise (i.e. widthwise) direction, and which undulates in a spanwise (i.e. lengthwise) direction. The mould 40 is supported on a frame 48 having a truss structure.

A feed apparatus 50 is located adjacent the root end 42 of the mould 40. The feed apparatus 50, which is shown in further detail in FIG. 3a, comprises a circular enclosure 52 and an exit ramp 54, which are supported on a frame 56. The exit ramp 54 extends outwardly from the circumference of the enclosure 52 towards the mould 40, and a support plate 57 is arranged between the enclosure 52 and the exit ramp 54. The feed apparatus 50 further includes a door 58 for accessing the enclosure 52. The door 58 includes a plurality of apertures 59, which provide a means of access to the enclosure 52 when the door 58 is closed. Alternatively or additionally, the apertures may be provided on the opposite side of the enclosure 52.

A series of mutually spaced rollers 60 are circumferentially arranged inside the enclosure 52. The rollers 60 have their axes of rotation substantially perpendicular to the circular plane of the enclosure 52. A plurality of guide plates 62 are arranged respectively in the spaces between adjacent rollers 60. The guide plates 62 have a coating 64 of polytetrafluoroethylene (PTFE) on an inner side, as shown in the close-up view of FIG. 3b.

A further series of mutually spaced rollers 68 are arranged along the exit ramp 54. These rollers 68 also have their axes of rotation substantially perpendicular to the circular plane of the enclosure 52. The feed apparatus 50 further comprises a power feed unit 70 comprising a motor 72 and a drive belt 74 (see FIG. 2). The drive belt 74 is looped around a plurality 76 of adjacent rollers 60 inside the enclosure 52 and around an axle 78 of the motor 72. As shown in FIG. 3a, the plurality 76 of adjacent rollers 60 are each provided with a rubber sleeve 80 to increase the friction between the drive belt 74 and the rollers 60. A brake 82 comprising a pinch roller 84 arranged opposite a rubber brake pad 86 is provided on the exit ramp 54.

Referring again to FIG. 2, a pultruded strip 88 of carbon-fibre reinforced plastics material (CFRP) is formed into a roll 90 and housed inside the enclosure 52 of the feed apparatus 50. The roll 90 is surrounded by the circumferentially arranged rollers 60 inside the enclosure 52. The rollers 60 enclose and retain the roll 90. Referring also to FIG. 18a, the roll 90 comprises a plurality of strips 88a, 88b, 88c, which are coiled sequentially, end-to-end, to form a single coil. The adjacent ends of successive strips in the roll 90 are connected together by connectors 92. As shown in the close-up view of FIG. 18b, the connectors 92 each have male and female mating parts 92a, 92b. The male part 92a is fitted to an end of one of the strips 88a in the roll 90 and the female part 92b is fitted to the adjacent end of the next strip 88b in the roll 90. The male and female parts 92a, 92b comprise mating formations that engage to connect the strips together.

The strips 88 are pre-formed in a pultrusion process in which carbon fibres are pulled through molten resin and subsequently through a pultrusion die to form strips of constant cross-section. The strips 88 are substantially rectangular in cross section, and have a width of approximately 150 mm and a thickness of approximately four millimetres. The strips 88 extend along the majority of the length of the blade, which is approximately eighty metres long, and hence each strip is close to eighty metres long.

A conveyance tray 94 is located in the mould 40 at the root end 42. The conveyance tray 94 is shown more clearly in the perspective view of FIG. 4. Referring to FIG. 4, the conveyance tray 94 is elongate and of lightweight construction and features a conveyance surface 96 between a pair of sidewalls 98. The conveyance surface 96 has a similar width to the width of the carbon-fibre strips, and has a low-friction coating of PTFE. The conveyance tray 94 extends from the root end 42 of the mould 40 up to a placement system 100, which will now be described.

The placement system 100 is located in the mould 40 and is supported by a plurality of arms 102. The arms 102 extend inwardly from a longitudinal flange 104 at an upper edge of the mould 40, and are regularly spaced along the length of the flange 104. Referring to FIG. 5, the placement system 100 is lifted into the mould 40 by a crane and is suspended from the arms 102. As well as supporting the placement system 100, the arms 102 also serve to position the placement system 100 correctly in the mould 40.

The placement system 100 is substantially elongate and comprises a conveyor 106, which is spaced above the surface 46 of the mould 40 by a pair of mutually opposed longitudinal guide walls 108 that depend downwardly from the conveyor 106. Referring to FIG. 7a, in cross-section, the shape of the placement system 100 resembles an upturned U. The guide walls 108 serve to define an elongate placement region 110 of rectangular cross section between the mould surface 46 (see FIG. 6) and the conveyor 106. Mutually opposed guide blocks 112 having a tapered upper end 114 are provided on an inner surface 116 of the guide walls 108.

As shown best in the partial longitudinal side view of FIG. 6, the placement system 100 is of modular construction and comprises a plurality of similar modules 118 which are fitted together end-to-end. The modules 118 are fixed together by a locking device in the form of a hook 120 on one of the modules 118 which is received in a corresponding eyelet 122 on an adjacent module 118. The modular system facilitates handling and construction of the placement system 100 and allows the placement system 100 to be adapted easily to the length of the mould 40. The guide walls 108 of the modules 118 comprise a plurality of apertures 124 which are spaced apart between vertical support members 126.

Referring still to FIG. 6, the conveyor 106 of the placement system 100 comprises a plurality of plates or 'runners' 128. The runners 128 are elongate steel plates 130 having a PTFE coating 132, and are arranged sequentially along the length of the placement system 100 to form a conveyor surface. The conveyor surface is discontinuous and is interrupted by gaps 134 between adjacent runners 128 at the positions of the vertical support members 126.

Referring to the transverse cross-sectional views of FIGS. 7a and 7b, the runners 128 are arranged in the form of two side-by-side and parallel tracks, which are supported respectively on a pair of brackets 136. A longitudinal space 138 is defined between the side-by-side runners 128. The respective brackets 136 are arranged in telescopic relation and are moveable relative to one another in a direction perpendicular to the direction of extension of the conveyor 106 to vary the separation between the side-by-side runners 128. Specifically, FIG. 7a shows the runners 128 in a closed position, in which the side-by-side runners 128 are located relatively close together and within the placement region 110; and FIG. 7b shows the runners 128 in an open position, in which the brackets 136 are extended relative to one another causing the runners 128 to withdraw from the placement region 110 through the apertures 124 defined in the guide walls 108. The runners 128 are opened and closed using a hydraulic ram 140 as shown in FIG. 6.

Referring now to FIGS. 8a and 8b, the placement system 100 includes a power drive unit 142, which comprises a motor 144 configured to turn a pair of drive wheels 146 via a drive belt 148. The drive wheels 146 are located at either end of an axle 150, and the drive belt 148 is looped around the axle 150 between the drive wheels 146 and around a parallel axle 152 of the motor 144. The drive wheels 146 are relatively large and are arranged generally above the runners 128. Two pairs of rollers 154 are arranged directly below the respective drive wheels 146. The rollers 154 are arranged substantially in the same plane as the runners 128. As shown in FIGS. 2 and 4, the power drive unit 142 is located close to a root end 156 of the placement system 100, close to the conveyance tray 94.

Figure 1A:
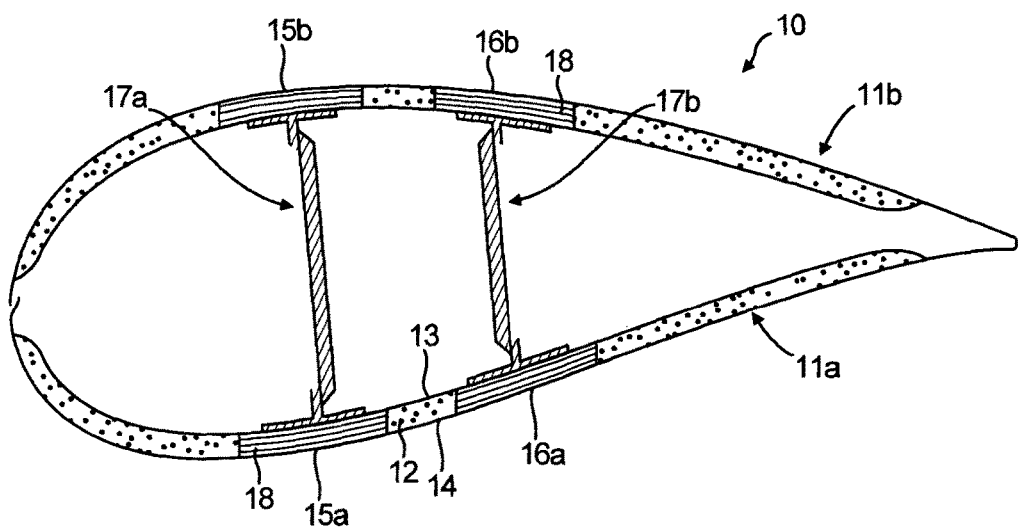
FIGS. 1a, 1b and 1c have already been described above by way of background to the present invention.
Figure 1B:
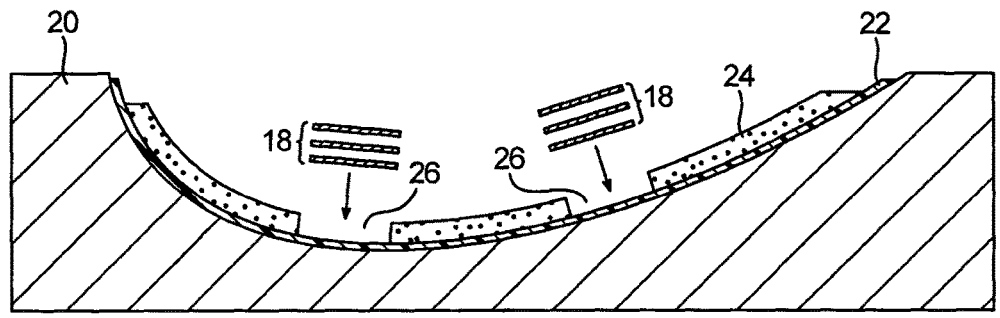
Figure 1C:
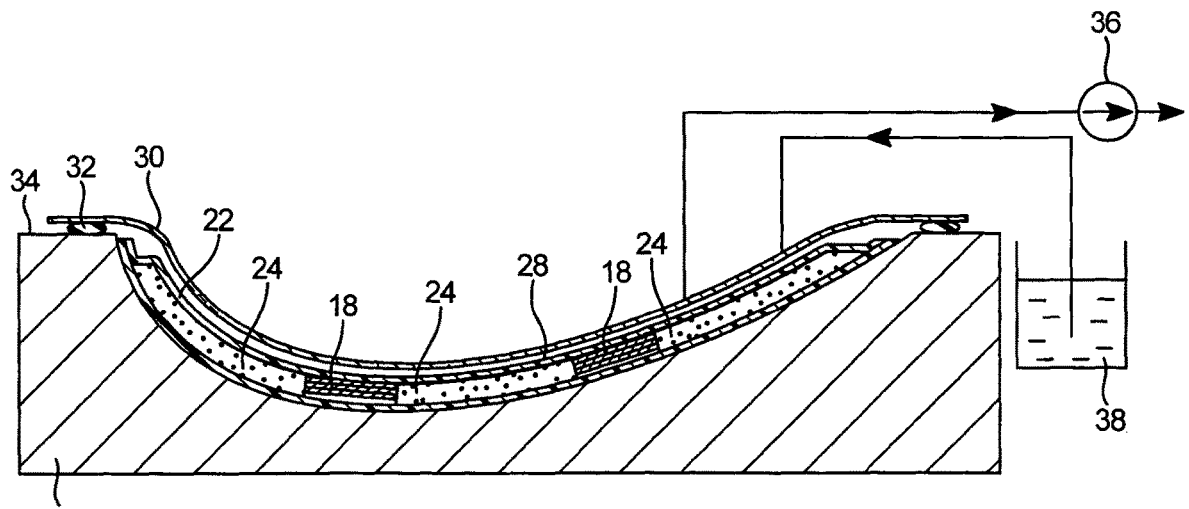

A method of making a wind turbine blade having a stack of pultruded CFRP strips integrated within the shell structure has been described above by way of background with reference to FIGS. 1b and 1c. According to the present invention, the feed apparatus 50 and placement system 100 described above may be used to facilitate the manufacturing process by feeding the pultruded strips 88 to the mould 40 and stacking the strips 88 in the mould 40, as will now be described in further detail with reference to FIGS. 2 to 10 of the drawings.

Referring again to FIG. 2, the CFRP roll 90 is initially loaded into the enclosure 52 of the feed apparatus 50. The roll 90 is held together by restraining straps (not shown) which prevent the strips 88 in the roll 90 from uncoiling during transportation. Once the roll 90 is loaded into the enclosure 52, the enclosure door 58 is closed to retain the roll 90 and the restraining straps are cut via the apertures 59 in the enclosure door 58 using suitable shears.

The roll 90 is surrounded and supported by the circumferentially arranged rollers 60 inside the enclosure 52 of the feed apparatus 50. The power drive unit 70 is activated to drive the plurality 76 of adjacent rollers 60 inside the enclosure 52 via the drive belt 74. This causes the roll 90 to rotate slowly inside the enclosure 52. As the roll 90 rotates, a free end 158 (FIG. 2) of an outermost strip 88 in the roll 90 exits the enclosure 52 through an outlet 160 (FIG. 3a) at the interface between the enclosure 52 and the exit ramp 54.

The power feed unit 70 continues to turn the roll 90, and the strip 88 advances in a feed direction 162, as indicated by the horizontal arrow in FIG. 2, over the series of rollers 68 that are spaced along the exit ramp 54. The strip 88 is guided onto the conveyor tray 94 in the mould 40, and as the roll 90 continues to turn within the enclosure 52, the strip 88 uncoils further and the free end 158 of the strip 88 advances along the low-friction conveyor surface 96 (FIG. 4) towards the placement system 100. The conveyor tray 94 guides the strip 88 onto the runners 128 of the conveyor 106 of the placement system 100. At this stage, the runners 128 are in a closed position, as shown in the cross-sectional view of FIG. 9a, which shows the strip 88 supported on the runners 128. The pinch roller brake 82 (FIG. 3a) of the feed apparatus 50 may be applied at any time to restrain the strip 88 and halt the feed process if required.

The power feed unit 70 of the feed apparatus 50 continues to turn the roll 90 until the free end 158 of the strip 88 reaches the power drive unit 142 of the placement apparatus 100. At this point, and as shown in FIG. 8b, the strip 88 is positioned between the drive wheels 146 and the opposed rollers 154 of the power drive unit 142. Referring also to FIG. 8a, the motor 144 of the power drive unit 142 is then activated causing the drive belt 148 to turn the drive wheels 146. The drive wheels 146 bear against the strip 88 and press the strip 88 against the opposed rollers 154. The frictional force between the drive wheels 146 and the strip 88 serves to advance the strip 88 along the conveyor 106 in the feed direction 162 towards the tip end 44 of the mould 40.

The strips 88 are pre-formed to the correct length, and the power drive unit 142 operates to propel the strip 88 along the conveyor until the free end 158 of the strip 88 approaches the end of the conveyor 106 near the tip end 44 of the mould 40, at which point the power drive unit 142 is de-activated.

Referring to FIG. 9b, once the full length of the strip 88 is supported on the runners 128, the hydraulic ram 140 (FIG. 6) is activated to open the runners 128, causing the strip 88 to drop onto the mould surface. The guide blocks 112 on the inner surface 116 of the guide walls 108 ensure that the strip 88 is centred in the placement region 110. Once the strip 88 has been placed in the mould 40, the runners 128 are re-closed and the above process is repeated to stack the subsequent strips in the roll 90 on top of one another in the placement region 110 as shown in FIG. 9c.

In order to reduce stress concentrations in the blade, successive strips 88 in the roll 90 are each slightly shorter than the previous strip and the strips 88 are stacked such that the respective ends of the strips form a step-wise arrangement (as shown in FIG. 16 for example). As shown in FIG. 10a, the ends 164 of the strips 88 are also tapered to further reduce stress concentrations in the stack. This arrangement is described in UK Patent Application No. 1121649.6. The length of the taper is typically around 450 millimetres, and so it will be appreciated that the extreme ends 164 of the strip 88 are very thin and flexible. In order to protect the tapered end 164 of the strip 88a relatively rigid sleeve 166 is provided over the end 164. In this example, the sleeve 166 is made from nylon, but it will of course be appreciated that other suitable materials may be used. Referring to the enlarged view of FIG. 10b, the nylon sleeve 166 is suitably longer than the gaps 164 between adjacent runners 128 and thereby prevents the end 164 of the strip 88 drooping into the gaps 164 which may otherwise damage the end 164 of the strip 88 or at least may disrupt the smooth passage of the strip 88 along the conveyor 106.

Further optional constructional details of the feed apparatus 50 will now be described with reference to FIGS. 11 to 15.

Referring to FIG. 11a, the feed apparatus 50 optionally comprises a carrier plate 170 on which the CFRP roll is supported. The carrier plate 170 in this example is round and shaped like a wheel. The plate 170 has a central aperture 172 serving as a mounting point, and a plurality of spokes 174 which extend radially from the central aperture 172 to a circumferential rim 176. This wheel-like construction is advantageously lightweight yet rigid. A series of radially-spaced holes 178 is provided in each spoke 174. The holes 178 serve as mounting points for a plurality of guide blocks 180, which are respectively fastened to the plurality of spokes 174. The guide blocks 180 are circularly arranged and the radial position of the guide blocks 180 is selected according to the length of the strip(s) 88, i.e. according to the annular thickness of the roll 90. A clamping block 182 is provided opposite one of the guide blocks 180 for gripping an innermost end 184 of the strip 88.

Referring to FIG. 11b, this shows schematically the coiled strip 88 mounted on the carrier 170. The innermost end 184 of the strip is gripped between the clamping block 182 and one of the guide blocks 180. This prevents the innermost end 182 of the strip 88 from bending once the strip 88 is largely uncoiled. The strip 88 is coiled around the outside of the guide blocks 180. The guide blocks 180 confine the strip 88 to a circumferential region 186 of the carrier 170 and prevent the strip 88 from uncoiling substantially within the enclosure 52 of the feed apparatus 50. It will be appreciated that a significant amount of potential energy is stored within a coiled CFRP pultruded strip, and if the strip 88 is not confined it will uncoil like a spring to fill the enclosure 52. Uncoiling in this way is dangerous and may damage the strip 88. Feeding a loosely coiled strip is also more difficult.

Referring now to FIG. 12, this is a transverse cross-sectional view of the feed apparatus 50. The feed apparatus 50 includes a carrier support 188 having a horizontal axle 190 on which the carrier plate 170 is mounted in use. A free end 192 of the axle 190 is supported in a U-shaped mount 194 provided on an inner side 196 of the enclosure door 58 when the enclosure door 58 is closed. The carrier 170 can be seen mounted inside the enclosure 52 in FIG. 13, although no strip is shown mounted on the carrier 170 in this view.

The feed apparatus 50 may be configured to feed strips 88 of different widths. Typically the strips 88 have a width of either 200 mm or 100 mm and the feed apparatus 50 is reconfigurable to accommodate either width as will now be explained with reference to FIGS. 14 and 15.

Referring to FIG. 14, the carrier 170 comprises a first tubular bushing 198 centrally mounted to a first side 200 of the carrier 170 and a second tubular bushing 202 centrally mounted to a second side 204 of the carrier 170. The bushings 198, 202 are coaxial and extend perpendicular to the plane of the plate 170. The first bushing 198 has a length of 160 mm and the second bushing 202 has a length of 60 mm. As shown in FIGS. 15a and 15b, the carrier 170 is reversibly mountable in the enclosure 52 and the plate 170 serves as a spacer plate to delimit the available space inside the enclosure 52 for housing the roll 90.

Referring specifically to FIG. 15a, the enclosure 52 has an internal width of approximately 280 mm as indicated by the double-headed arrow 206. The spacer plate 170 is mounted on the axle 190 with the first side 200 of the plate 170 facing the enclosure door 58 and the second side 204 of the plate 170 facing the carrier support 188. In this orientation, the second bushing 202 spaces the plate relative to the carrier support by 60 mm, as indicated by the arrows 206. Consequently, an available space having a width of 220 mm is defined between the plate 170 and the enclosure door 58 as indicated by the double-headed arrow 208. This space is suitable for strips 88 having a width of 200 mm and ensures that the strips 88 are sufficiently retained inside the enclosure 52.

Referring specifically to FIG. 15b, here the carrier 170 is reversed such that the second side 204 of the plate 170 faces the enclosure door 58 and the first side 200 of the plate 170 faces the carrier support 188. In this orientation, the first bushing 198 spaces the plate 170 relative to the carrier support 188 by 160 mm such that an available space having a width of 120 mm is defined between the plate 170 and the enclosure door 58. This space is suitable for strips 88 having a width of 100 mm and ensures that the strips 88 are sufficiently retained inside the enclosure 52.

The strip(s) 88 are transported on the carrier 170 to the wind turbine blade manufacturing facility. The assembly of the strip 88 and carrier 170 is referred to herein as a cartridge. Restraining straps are used to prevent the strip 88 from uncoiling during transportation. At the wind turbine manufacturing facility, the cartridge is loaded into the enclosure 52, the enclosure door 58 is closed, and the restraining straps are cut through the apertures 59 in the enclosure door 58. The strip 88 is confined inside the enclosure 52 by the spacer plate 170 and the circularly arranged guide blocks 180 such that when the straps are cut, the strip 88 remains relatively tightly coiled within the enclosure 52 and does not uncoil substantially.

FIG. 16 illustrates an alternative manufacturing method in accordance with the present invention, in which the pultruded strips 88 are stacked in a separate mould, provided as a U-shaped channel 210, outside of the main wind turbine blade mould 40, together with a matrix (resin or adhesive) which is pre-cured so that the stack is formed in the separate mould 210. The pre-cured stack 212 is then placed in the main wind turbine blade mould 40 for a resin infusion process together with the other structural elements. The feed apparatus 50 described above is used to feed the strips 88a, 88b, 88c directly into the U-shaped channel 210, or to a placement system 100 as described above and arranged to stack the strips in the U-shaped channel 210.

FIG. 17 illustrates a further alternative manufacturing method in which the strips 88 are stacked on an assembly jig 214 outside the mould 40. The assembly jig 214 comprises a series of supports 216, each having a rectangular cut-out 218 at an upper end 220 for retaining the strips 88. The supports 216 are of varying heights to correspond with the undulating surface of the wind turbine blade mould 40. Once the stack has been assembled on the jig 214, the stack is lifted into the wind turbine blade mould 40. The feed apparatus 50 described above is used to feed the strips directly onto the assembly jig 214, or to a placement system 100 as described above and arranged to stack the strips on the jig 214. The jig 214 may be substituted for a suitable process table or equivalent supporting structure.

FIG. 19 illustrates a further alternative manufacturing method. In this method, rather than the roll 90 comprising a plurality of successively coiled pultruded strips 88, the roll 90 comprises a single longer pultruded strip 222. The method involves feeding the strip 222 from the feed apparatus 50 and cutting the strip 222 as it is fed to form a plurality of individual strips to be stacked. The apparatus comprises a cutting tool 224 arranged in line with the feed apparatus 50. The apparatus further comprises a chamfering tool 226 also arranged in line with the feed apparatus 50 which is configured to form the tapered ends 164 of the strips as described above with reference to FIG. 10b.

FIG. 20 illustrates a further alternative manufacturing method in which the placement system 100 described above is omitted. Here, the feed apparatus 50 comprises a motorised pulley 228 arranged adjacent the tip end 44 of the wind turbine blade mould 40 and connected to the free end 158 of the pultruded strip 88 via a cable 230. The pulley 228 is configured to pull the strip 88 in the feed direction 162 so as to uncoil the strip 88 in the feed apparatus 50. Whilst now shown, a further alternative embodiment is envisaged in which the placement system 100 and the pulley 228 are omitted and the power feed unit 70 of the feed apparatus 50 is used to drive the strip 88 further in the feed direction 162, for example along substantially the entire length of the mould 40. The feed apparatus 50 could otherwise be fitted with a handle and optionally a suitable gear system to allow the roll 90 to be turned manually to feed the strip 88.

It will be appreciated that many other modifications may be made to the examples described above without departing from the scope of the present invention as defined in the accompanying claims. For example, rather than being fed into the blade mould or onto a blade manufacturing tool, the strips may simply be fed onto the factory floor before being transferred into the mould. For example, the strips may be stacked on the factory floor adjacent the mould and then the stack may be transferred into the mould.

The invention claimed is:

1. A feed apparatus for feeding pultruded strips of fibrous reinforcing material along a feed direction, comprising:
    a rotatable carrier carrying a coiled roll of pultruded strips of fibrous reinforcing material, the coiled roll of pultruded strips having an outermost layer and one or more inner layers, wherein the carrier includes a central hub and a plurality of spokes extending therefrom, and wherein the carrier further includes a guiding block and a clamping block disposed on one of the plurality of spokes for securing an innermost end of the coiled roll of pultruded strips; and
    at least one roller disposed radially outward of the rotatable carrier and fixed relative to the rotatable carrier, wherein the at least one roller engages an outer surface of the outermost layer of the coiled roll of pultruded strips and presses the outermost layer toward the one or more inner layers of the coiled roll of pultruded strips to maintain the pultruded strips in a coiled state.

2. The feed apparatus of claim 1, wherein the one of the plurality of spokes includes a series of radially-spaced holes for adjustably positioning the clamping block and/or the guiding block.

3. The feed apparatus of claim 1, wherein the carrier includes a plurality of guiding blocks.

4. The feed apparatus of claim 1, further comprising a turning mechanism operatively coupled to the carrier for turning the coiled roll of pultruded strips.

5. The feed apparatus of claim 1, further comprising a pulling device configured to pull the free end of the strip in the feed direction.

6. The feed apparatus of claim 1, wherein the guiding block and the clamping block are spaced from the central hub of the carrier.

7. The feed apparatus of claim 1, further comprising an enclosure for housing the coiled roll of pultruded strips, the enclosure having an outlet through which a free end of the pultruded strips exits the enclosure.

8. The feed apparatus of claim 7, further comprising a door, which when opened allows the carrier to be inserted in or removed from the enclosure, and which when closed retains the carrier in the enclosure.

9. The feed apparatus of claim 7, wherein the at least one roller is arranged inside the enclosure.

10. A system for making a wind turbine blade having at least one pultruded strip of fibrous reinforcing material integrated with a shell of the blade, comprising:
    a feed apparatus for dispensing a pultruded strip of fibrous reinforcing material, the feed apparatus comprising:
        a rotatable carrier carrying a coiled roll of pultruded strips of fibrous reinforcing material, the coiled roll of pultruded strips having an outermost layer and one or more inner layers, wherein the carrier includes a central hub and a plurality of spokes extending therefrom, and wherein the carrier further includes a guiding block and a clamping block disposed on one of the plurality of spokes for securing an innermost end of the coiled roll of pultruded strips; and
        at least one roller disposed radially outward of the rotatable carrier and fixed relative to the rotatable carrier, wherein the at least one roller engages an outer surface of the outermost layer of the coiled roll of pultruded strips and presses the outermost layer toward the one or more inner layers of the coiled roll of pultruded strips to maintain the pultruded strips in a coiled state;
    a surface having a first location and a second location remote from the first location, wherein the feed apparatus is configured to be positioned adjacent the first location and a free end of the pultruded strips in the feed apparatus is fed in a feed direction toward the second location, and wherein the pultruded strips are stacked one on top of another to form a stack of strips;
    an elongate member configured to couple to the stack of strips that are formed on the surface, wherein the elongate member is configured to support the stack of strips in a non-continuous manner; and
    a wind turbine blade mould, wherein the elongate member is configured to be suspended above the wind turbine blade mould such that the stack of pultruded strips extends in a longitudinal direction of the blade mould.

* * * * *